(12) United States Patent
May et al.

(10) Patent No.: US 12,675,479 B2
(45) Date of Patent: Jul. 7, 2026

(54) SELECTIVE CACHE ENTRY REMOVAL FEATURE

(71) Applicant: SAP SE, Walldorf (DE)

(72) Inventors: Norman May, Karlsruhe (DE); Dan Ding, Xi'an (CN); Zhe Qu, Xi'an (CN); Fei Qiu, Xi'an (CN); Zhilong Hao, Xi'an (CN); Jiaxin Liu, Xi'an (CN); Jiao Chen, Xi'an (CN)

(73) Assignee: SAP SE, Walldorf (DE)

( * ) Notice: Subject to any disclaimer, the term of this patent is extended or adjusted under 35 U.S.C. 154(b) by 53 days.

(21) Appl. No.: 18/599,510

(22) Filed: Mar. 8, 2024

(65) Prior Publication Data

US 2025/0284687 A1 Sep. 11, 2025

(51) Int. Cl.
*G06F 16/2453* (2019.01)
*G06F 16/2455* (2019.01)

(52) U.S. Cl.
CPC .. *G06F 16/24539* (2019.01); *G06F 16/24552* (2019.01)

(58) Field of Classification Search
CPC .................................................. G06F 16/2453
See application file for complete search history.

(56) References Cited

U.S. PATENT DOCUMENTS

2006/0026154 A1* 2/2006 Altinel ............. G06F 16/24552
707/999.005
2018/0129708 A1* 5/2018 Beavin ............. G06F 16/24552
2023/0401331 A1* 12/2023 Xu ....................... G06F 21/6254
2024/0303200 A1* 9/2024 Tamilarasan ........ G06F 12/0864

OTHER PUBLICATIONS

Zhang, X. et al."UTCache: Updatable Transactional Cache For Database-Driven Applications." In 2022 29th Asia-Pacific Software Engineering Conference (APSEC) (pp. 41-50). IEEE (2022).
Extended European Search Report issued in European Application No. 24214211.5-1203 mailed Apr. 3, 2025, 8 pages.

* cited by examiner

*Primary Examiner* — Van H Oberly
(74) *Attorney, Agent, or Firm* — Mintz Levin Cohn Ferris Glovsky and Popeo, P.C.

(57) ABSTRACT

A database management system generates a cache entry system view of a database cache. Also, a new column is generated for the cache entry system view, where the new column is an ENTRY_HASH column to identify each entry of the database cache. In an example, the database management system detects a request to remove a given entry of the database cache, where the request includes a given ENTRY_HASH value to locate the given entry of the database cache. In response to receiving the request, the database management system identifies the given entry of the database cache based on the given ENTRY_HASH value. Then, the database management system removes the given entry of the database cache. Also, the database management system notifies a cache manager that the given entry has been removed.

11 Claims, 11 Drawing Sheets

Cache Entry System
View
300

| Host | Port | Volume_ID | Cache_ID | Entry_ID | Entry_Description | Component | User_Name | Memory_Size | Create_Time | Read_Count | Last_Access_Time | ENTRY_HASH |
|------|------|-----------|----------|----------|-------------------|-----------|-----------|-------------|-------------|------------|------------------|------------|
| 305 | 310 | 315 | 320 | 325 | 330 | 335 | 340 | 345 | 350 | 355 | 360 | 365 |
|  |  |  |  |  |  |  |  |  |  |  |  |  |
| : | : | : | : | : | : | : | : | : | : | : | : | : |

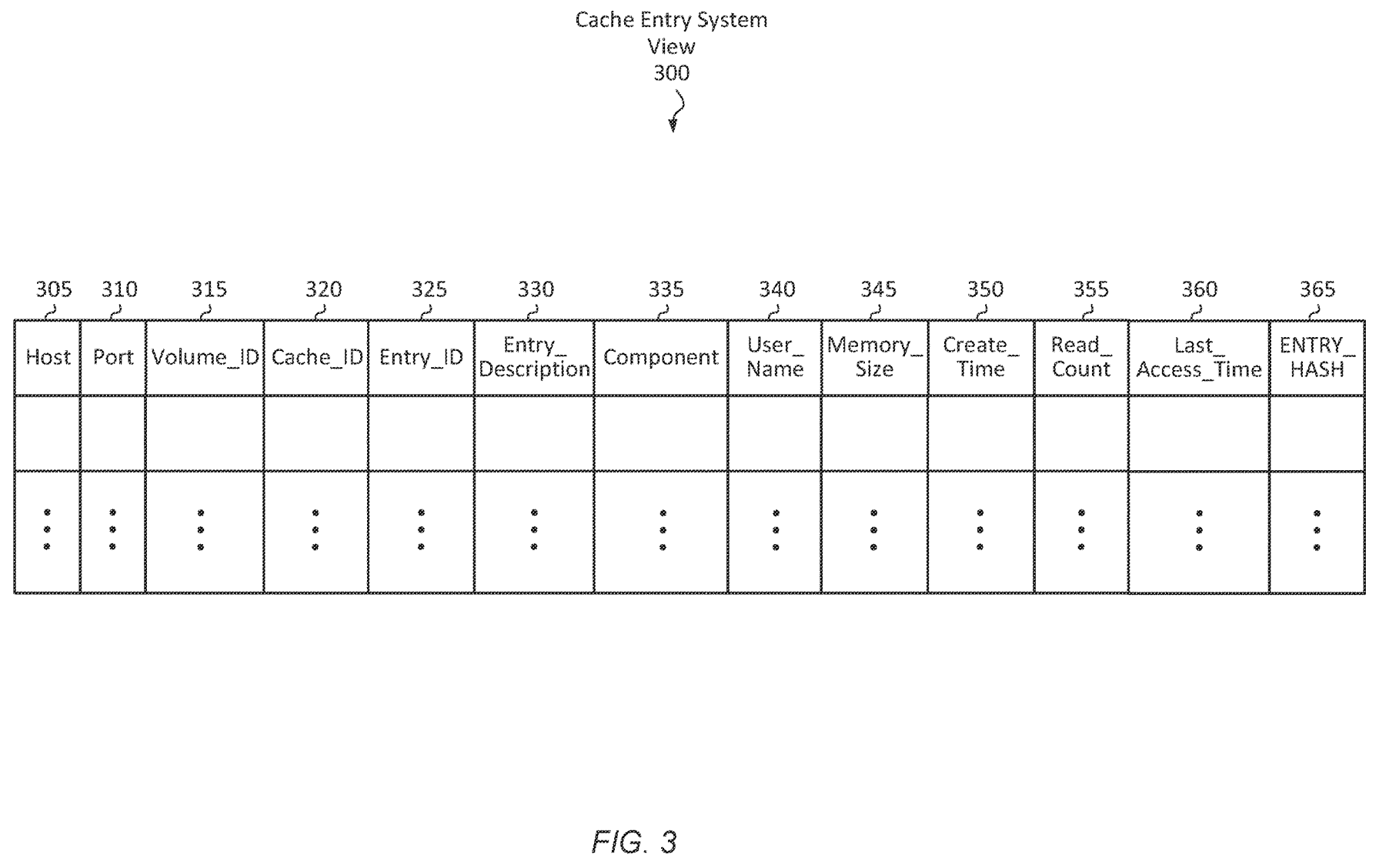

Cache Entry System View 300

| Host | Port | Volume_ID | Cache_ID | Entry_ID | Entry_Description | Component | User_Name | Memory_Size | Create_Time | Read_Count | Last_Access_Time | ENTRY_HASH |
|---|---|---|---|---|---|---|---|---|---|---|---|---|
| 305 | 310 | 315 | 320 | 325 | 330 | 335 | 340 | 345 | 350 | 355 | 360 | 365 |
| ... | ... | ... | ... | ... | ... | ... | ... | ... | ... | ... | ... | ... |

FIG. 3

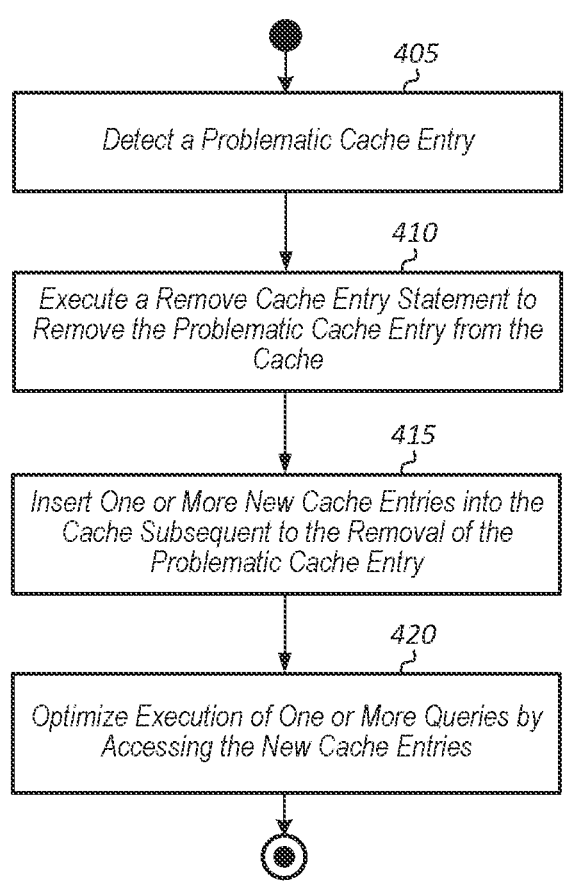
*400*
*405*
Detect a Problematic Cache Entry
*410*
Execute a Remove Cache Entry Statement to Remove the Problematic Cache Entry from the Cache
*415*
Insert One or More New Cache Entries into the Cache Subsequent to the Removal of the Problematic Cache Entry
*420*
Optimize Execution of One or More Queries by Accessing the New Cache Entries
*FIG. 4*

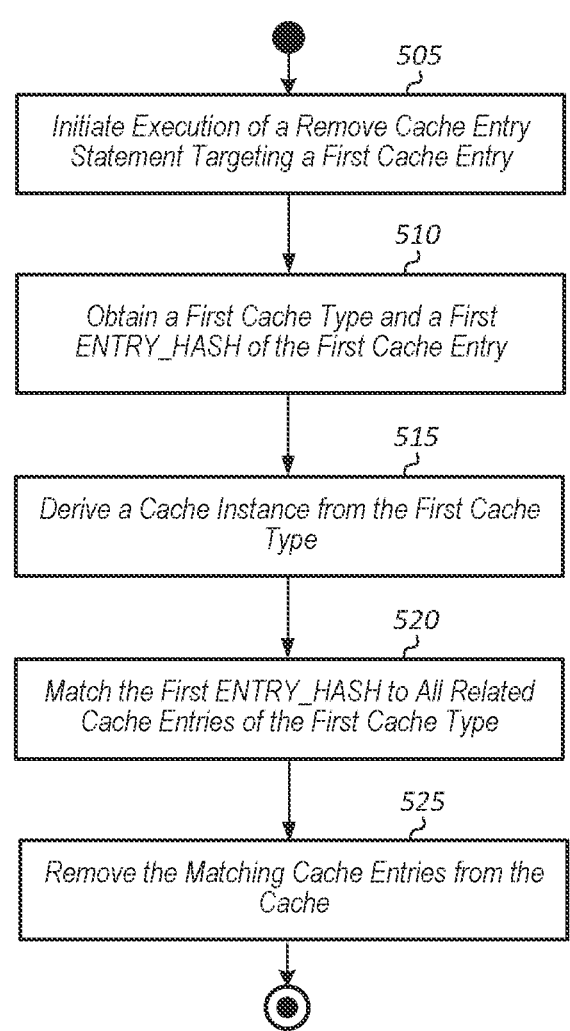
*500*
505
Initiate Execution of a Remove Cache Entry
Statement Targeting a First Cache Entry
510
Obtain a First Cache Type and a First
ENTRY_HASH of the First Cache Entry
515
Derive a Cache Instance from the First Cache
Type
520
Match the First ENTRY_HASH to All Related
Cache Entries of the First Cache Type
525
Remove the Matching Cache Entries from the
Cache
*FIG. 5*

600

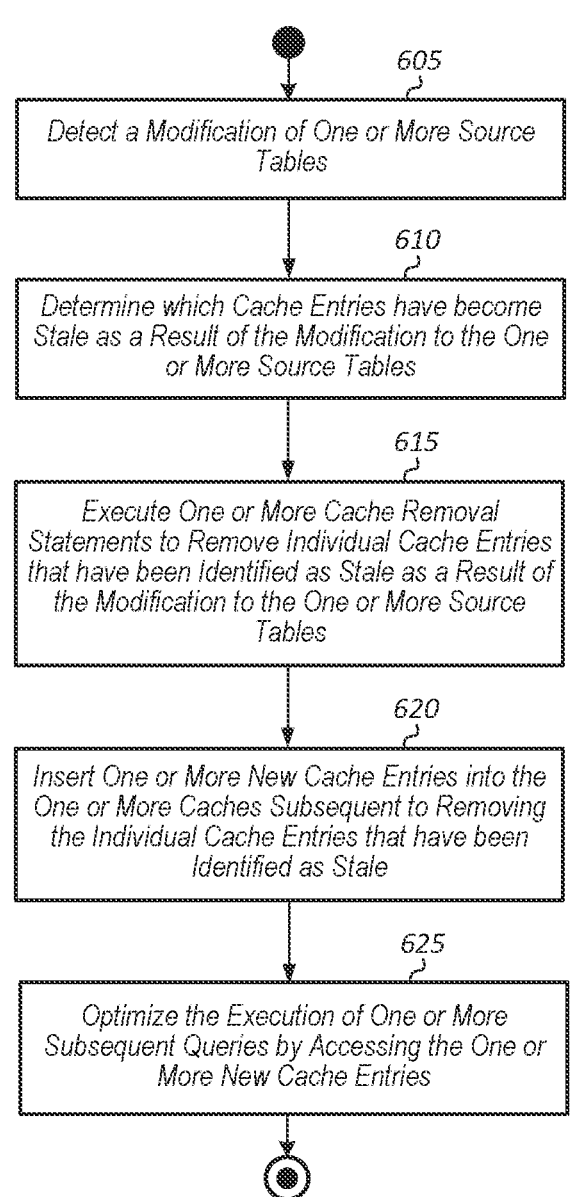

605

Detect a Modification of One or More Source
Tables

610

Determine which Cache Entries have become
Stale as a Result of the Modification to the One
or More Source Tables

615

Execute One or More Cache Removal
Statements to Remove Individual Cache Entries
that have been Identified as Stale as a Result of
the Modification to the One or More Source
Tables

620

Insert One or More New Cache Entries into the
One or More Caches Subsequent to Removing
the Individual Cache Entries that have been
Identified as Stale

625

Optimize the Execution of One or More
Subsequent Queries by Accessing the One or
More New Cache Entries

FIG. 6

700

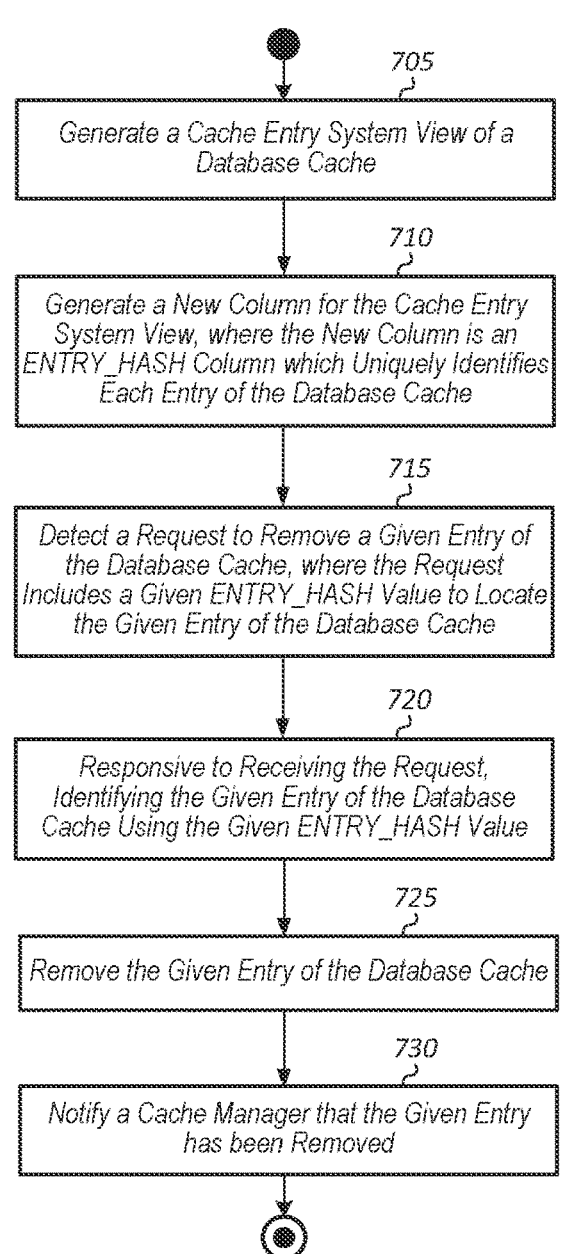

705

Generate a Cache Entry System View of a Database Cache

710

Generate a New Column for the Cache Entry System View, where the New Column is an ENTRY_HASH Column which Uniquely Identifies Each Entry of the Database Cache

715

Detect a Request to Remove a Given Entry of the Database Cache, where the Request Includes a Given ENTRY_HASH Value to Locate the Given Entry of the Database Cache

720

Responsive to Receiving the Request, Identifying the Given Entry of the Database Cache Using the Given ENTRY_HASH Value

725

Remove the Given Entry of the Database Cache

730

Notify a Cache Manager that the Given Entry has been Removed

FIG. 7

800

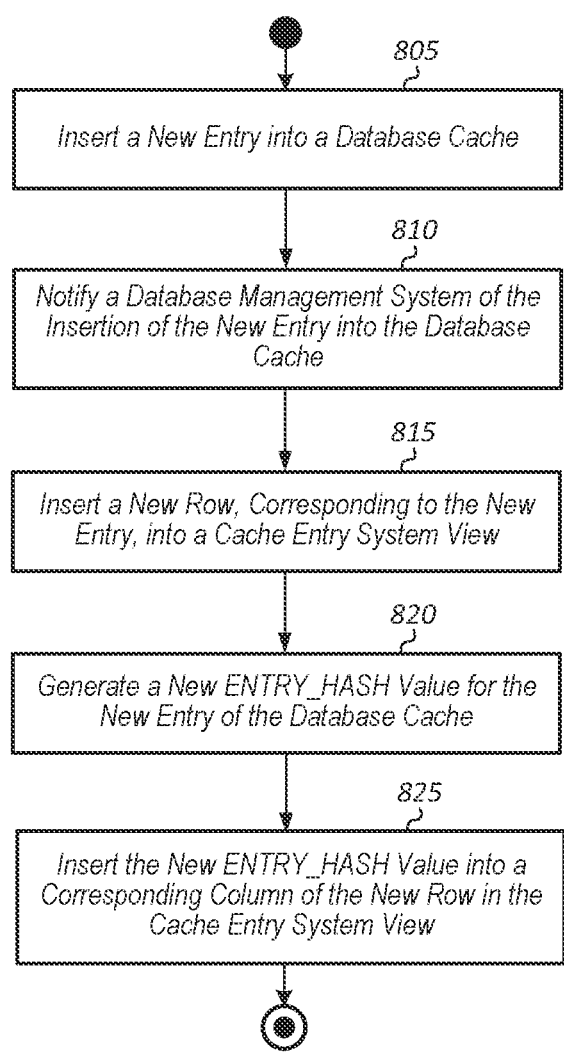

805

Insert a New Entry into a Database Cache

810

Notify a Database Management System of the Insertion of the New Entry into the Database Cache

815

Insert a New Row, Corresponding to the New Entry, into a Cache Entry System View

820

Generate a New ENTRY_HASH Value for the New Entry of the Database Cache

825

Insert the New ENTRY_HASH Value into a Corresponding Column of the New Row in the Cache Entry System View

FIG. 8

SELECTIVE CACHE ENTRY REMOVAL FEATURE

TECHNICAL FIELD

The present disclosure generally relates to managing caches in a database environment.

BACKGROUND

Organizations increasingly need to manage large amounts of data in their database systems. Running queries on such database systems can use a significant amount of computing resources, including computer memory, storage, and processor resources. Therefore, it can be important to reuse query results when possible. One way of reusing query results is to cache the results so they can be used later, such as when the same query is run again.

Caching query results from a particular view can save computing resources at the cost of increased memory consumption. When a subsequent query is received that operates on the particular view, the cached query results can be reused. Reusing cached query results can be efficient in some situations, but also suffers from some drawbacks. For example, the subsequent query may perform data manipulation operations (e.g., aggregation, filtering, etc.) that require additional processing to be performed on the cached query results. Such additional processing can be resource intensive in terms of memory, storage, and/or processing resources.

SUMMARY

In some implementations, a database management system generates a cache entry system view of a database cache. Also, a new column is generated for the cache entry system view, where the new column is an ENTRY_HASH column to identify each entry of the database cache. In an example, the database management system detects a request to remove a given entry of the database cache, where the request includes a given ENTRY_HASH value to locate the given entry of the database cache. In response to receiving the request, the database management system identifies the given entry of the database cache based on the given ENTRY_HASH value. Then, the database management system removes the given entry of the database cache. Also, the database management system notifies a cache manager that the given entry has been removed.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an example of a cache entry system view, in accordance with some example implementations of the current subject matter;

FIG. 4 illustrates an example of a process for executing a remove cache entry statement, in accordance with some example implementations of the current subject matter;

FIG. 5 illustrates an example of another process for executing a remove cache entry statement, in accordance with some example implementations of the current subject matter;

FIG. 6 illustrates an example of a process for responding to a source table modification, in accordance with some example implementations of the current subject matter;

FIG. 7 illustrates an example of a process for generating a cache entry system view, in accordance with some example implementations of the current subject matter;

FIG. 8 illustrates an example of a process for inserting a new entry into a database cache, in accordance with some example implementations of the current subject matter;

DETAILED DESCRIPTION

Figure 1:
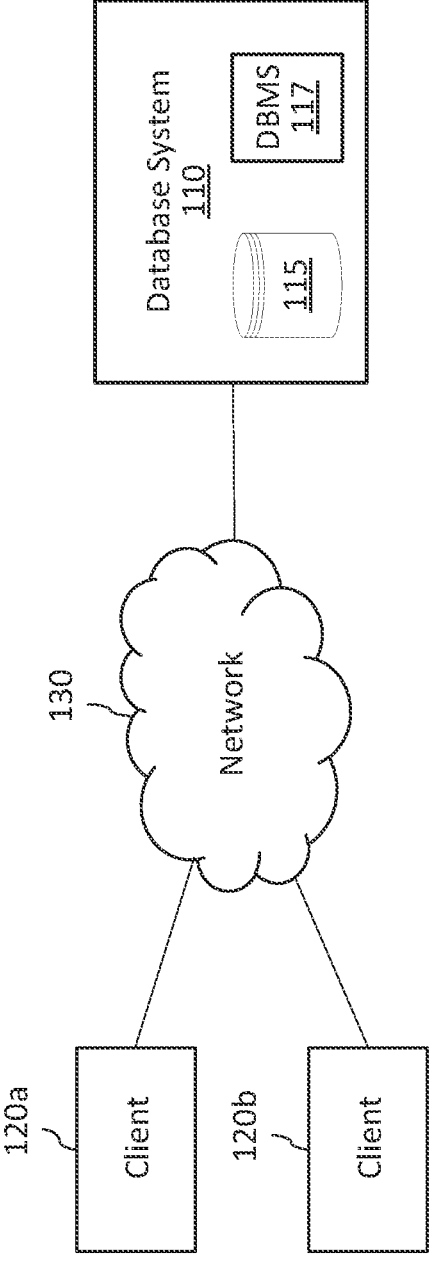
FIG. 1 illustrates a logical diagram of an example of a database system, in accordance with some example implementations of the current subject matter.

A database may include different types of caches that are established on a common cache infrastructure. A primary component of this common cache infrastructure is the cache manager, which is typically located on every index server. The common cache infrastructure offers functions for cache entries insertion, cache lookup, and clearing cache entries. Upon query execution, in the event a valid cache entry with the result is discovered, the cached result is returned. Conversely, when a valid cache entry is not found, the cache entry is consequently inserted into the cache by the cache manager.

When a database operates for a considerable duration, many cache entries may be produced to accelerate the cache lookup result. The number of cache entries that are produced will eventually exceed the size of the cache. Therefore, removing (i.e., clearing) infrequently used cache entries is essential to maintain performance and cache efficiency. Typically, clearing cache entries will result in the removal of all entries of a specific cache type. In certain circumstances, there may be a need to refresh a specific cache entry rather than clearing them all. For instance, when some source tables are modified, removing a specific cache entry is more desirable and efficient than eliminating all cache entries of a particular type and then subsequently reloading them completely. Moreover, the option to remove a particular cache entry is useful when a high memory load entry is no longer beneficial.

The challenge is that when many cache entries are generated, a user only wants to remove a specific problematic one without affecting the other cache entries. To make the system user-friendly, a Selective Cache Entry Removal feature may be introduced. With this feature, one new column ENTRY_HASH is introduced to the view M_CACHE_ENTRIES. Users can review the detailed information of a specific cache entry via the M_CACHE_ENTRIES view. And ENTRY_HASH may be used as a filter to remove a specified cache entry by executing the newly added SQL statement 'ALTER SYSTEM REMOVE CACHE (' ') ENTRY (' ',' ' . . . )'. By running the SQL statement 'ALTER SYSTEM REMOVE CACHE (' ') ENTRY (' ',' ' . . . )', the cache type and ENTRY_HASH are obtained. With the cache type, the cache instance may be derived from the cache manager. From here, the ENTRY_HASH can be matched to all related cache entries of this cache type. A shared lock may be used when the parallel cache insertion and cache lookup are performed for the specific cache type. An exclusive lock may be used for the cache entry removal. So, if there are any cache entry removals in progress, the removals will be processed sequentially.

In an example, every cache instance manages two kinds of cache resources. One is a single-value cache, and the other is a transactional-value cache. For a single-value cache, there is only one cache entry for one cache key. So, when the exact cache entry is found, the cache entry is removed. A transactional-value cache may contain multiple versioned cache entries for the same cache key. Subsequently, the ENTRY_HASH is used to erase the matched version cache entry within its entirety. For a single-value cache, removing a cache entry means evicting the cache resource from the cache instance. However, in the case of a transactional-value cache, this action only takes place when there's only one version of the cache entry. Otherwise, removing one cache entry will not lead to the eviction of the cache resource from the cache instance. The selective cache entry removal feature provides robust efficiency in removing cache entries and provides a better user experience.

FIG. 1 illustrates an example of a database system 110, in accordance with some implementations of the current subject matter. The database system 110 may include any number and type of databases 115 including, for example, an in-memory database, a relational database, a non-SQL (NoSQL) database, and/or other types of databases. In an example, database 115 may be an SAP HANA database as available from SAP SE, Walldorf, Germany. The database system 110 also includes database management system (DBMS) 117. The database management system 117 may be configured to process database queries from the first client 120a and/or the second client 120b.

In some implementations, the database system 110 and/or any of its components may be incorporated and/or part of a container system that may be used in cloud implementations. The database system 110 may include any number of servers and other physical components. Furthermore, the database system 110 may be communicatively coupled, via a network 130, to a plurality of clients including, for example, a first client 120a and a second client 120b. The network 130 may be a wired and/or wireless network including, for example, a wide area network (WAN), a local area network (LAN), a public land mobile network (PLMN), the Internet, and/or the like. The client devices 120a-b may be processor-based devices including, for example, one or more of a smartphone, a tablet computer, a wearable apparatus, a virtual assistant, an Internet-of-Things (IoT) appliance, and/or the like.

Database system 110 may include any number of servers which may be running instances of the corresponding executables (e.g., .exe files) included in a kernel of the database system 110. It should be appreciated that the kernel of the database system 110 may also include other executable (e.g., .exe files) required for running the database system 110. In some implementations, an executable may be a computer program that has already been compiled into machine language (e.g., binary code) and is therefore capable of being executed directly by a data processor. In an example, the database system 110 may be a dedicated, single-container database system running a single instance of a primary server and/or a secondary server. However, where the database system 110 implements a multitenant database architecture (e.g., multitenant database containers (MDC)), each tenant of the database system 110 may be served by separate instances of the primary server and/or the secondary server.

Figure 2:
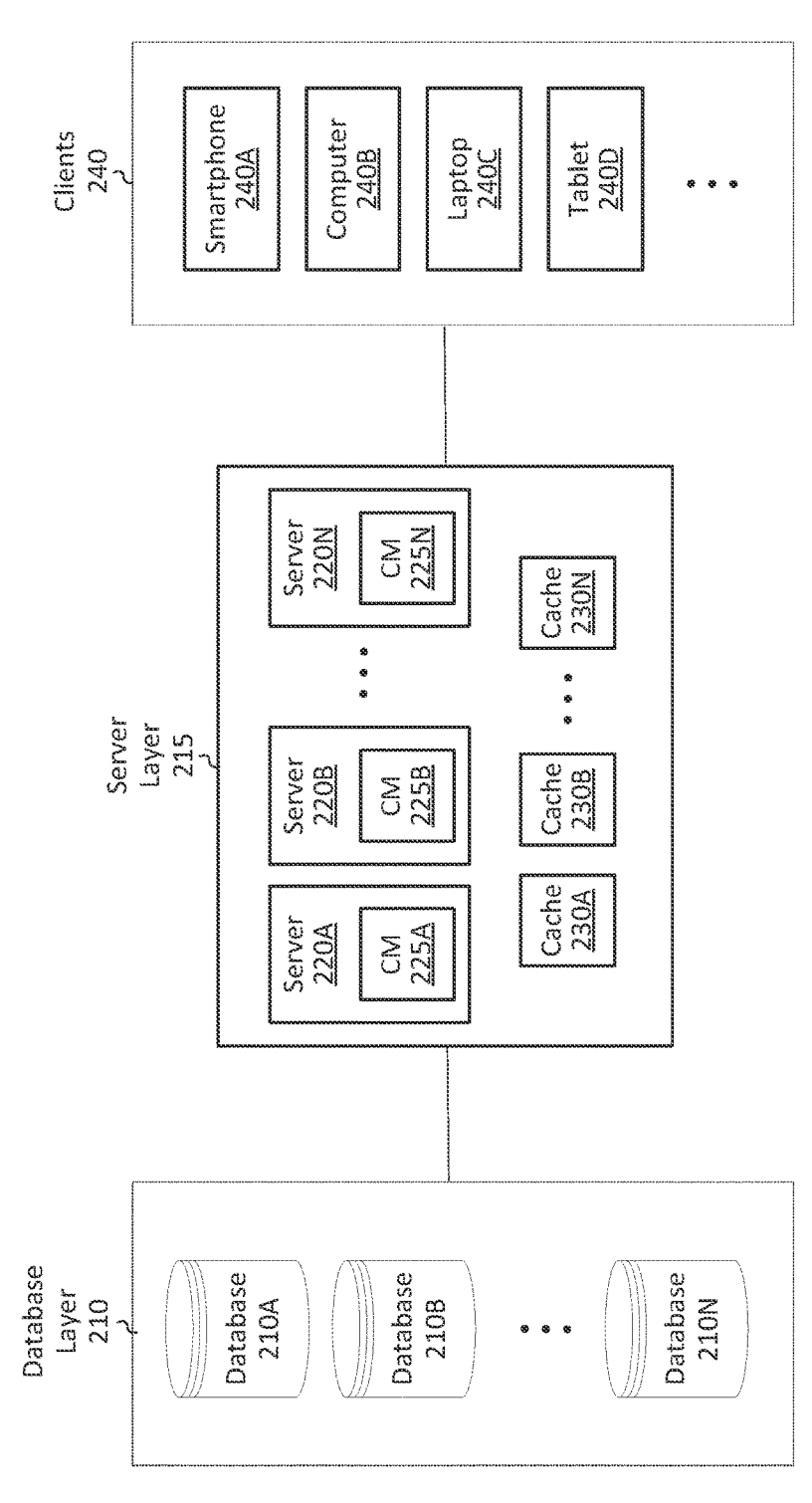
FIG. 2 illustrates a block diagram of a database system, in accordance with some example implementations of the current subject matter.

Turning now to FIG. 2, an example of a database system 200 is shown, in accordance with some example embodiments. In an example, database system 200 includes database layer 210, server layer 215, and clients 240. Database layer 210 includes any number and type of databases 210A-210N. The databases 210A, 210B, and 210N can include any combination of one or more of a relational database, a multi-dimensional database, an in-memory facility, an object database, an Extensible Markup Language (XML) document, flat files, or any other data storage system that supports structured or unstructured data. Such databases 210A-N may be distributed among several different entities.

Servers 220A-N may be any type of servers, such as index servers, primary servers, secondary servers, and so on. The servers 220A-N can include any combination of one or more of cloud-based or on-premise resources and may be exposed and/or accessed via one or more networks. Each server 220A-N may have one or more corresponding cache managers (CMs) 225A-N. For example, server 220A includes cache manager 225A, server 220B includes cache manager 225B, and server 220N includes cache manager 225N. Cache managers 225A-N are configured to manage caches 230A-N, which are representative of any number and type of caches (e.g., hierarchy cache). Clients 240 include any number and type of clients including smartphone 240A, computer 240B, laptop 240C, tablet 240D, and other computing devices and/or computing systems.

When the database system 200 operates for a significant duration of time, many cache entries in caches 230A-N may be produced to accelerate query execution by reusing query results. In certain circumstances, there may be a need to refresh a specific cache entry rather than clearing all of the cache entries. For instance, when one or more source tables are modified, removing a specific cache entry is more desirable and efficient than eliminating all cache entries of this type and completely reloading the cache entries. Moreover, the option to remove a particular cache entry is useful when a high memory load entry is no longer beneficial.

In an example, every cache instance manages two kinds of cache resources. One is a single-value cache, the other is a transactional-value cache. In some embodiments, a single-value cache is used to represent single value table columns within a table or table object. The single value cache may be included in a non-persistent or transient runtime data object. A single-value cache can be represented by a list of tuples T(a,b) where "a" is column id of a single valued column and "b" is the single value included in the single value column associated with the column id. Since a table or table object may contain a variable number of single valued columns, the size of a single-value cache may vary. In some embodiments, the single value cache is not persisted via a persistent runtime data descriptor. Instead, a persistent column descriptor of a unified table container is used to persist a single-value cache. In some embodiments, the unified table container includes one or more persistent column descriptors for each column in the table.

Referring now to FIG. 3, an example of a cache entry system view 300 is shown, in accordance with some example embodiments. In an example, the cache entry system view 300 is referred to as a "M_CACHE_ENTRIES" view for a database cache (e.g., cache 230B of FIG. 2). As used herein, the term "cache entry system view" is defined as a monitoring view that provides runtime data on a plurality of cache entries of one or more database caches. Also, the term "monitoring view" is defined as a runtime view including statistics and status information related to the execution of data manipulation language (DML) statements. The cache entry system view 300 may include a plurality of columns as shown in FIG. 3. However, these columns are merely representative of one particular embodiment. It should be understood that in other embodiments, the cache entry system view 300 may be structured differently and/or include other numbers and types of columns.

As shown in FIG. 3, cache entry system view 300 includes a host column 305 to display the host name while the port column 310 displays the internal port. Moving left to right, the volume_ID column 315 displays the persistence volume identifier (ID) while the cache_ID column 320 displays the ID of the cache that created the entry. The entry_ID column 325 displays the ID of the cache entry and the entry_description column 330 displays a description of the cached entry. The component column 335 displays the information about the component that created the cached entry and the user_name column 340 displays the information about the user that created the cache entry. The memory_size column 345 displays the amount of memory used to store the cached entry in the cache. In an example, the memory_size column 345 displays the amount of memory as a number of bytes. The create_time column 350 displays the point in time when the cache entry was inserted into the cache. The read_count column 355 indicates how often the cache entry was successfully read from the cache while the last_access_time column 360 displays the time of the last access of the cache instance.

In some embodiments, a new column, ENTRY_HASH 365, may be added to cache entry system view 300 to enable clients to remove a specific cache entry from a corresponding cache. A client may review the detailed information of a specific cache entry via cache entry system view 300. The client may use ENTRY_HASH as the filter to remove a specified cache entry by executing a newly added SQL statement 'ALTER SYSTEM REMOVE CACHE (' ') ENTRY (' ',' ' . . . )'. By running the SQL statement 'ALTER SYSTEM REMOVE CACHE (' ') ENTRY (' ',' ' . . . )', the cache type and ENTRY_HASH are obtained. With the cache type, the cache instance may be derived by the cache manager. From here, the ENTRY_HASH can be matched to all related cache entries of this cache type. As used herein, the term "ENTRY_HASH column" is defined as a column in a cache entry system view, with each value in the column uniquely identifying a corresponding cache entry. Also, the term "ENTRY_HASH" is defined as a filter used to remove a specified cache entry, such as when executing a remove cache entry statement.

Referring now to FIG. 4, a process is depicted for executing a remove cache entry statement, in accordance with some example embodiments. At the start of the process, a problematic cache entry is detected (block 405). The cache entry may be determined to be problematic based on a memory issue, a duration of time since a last access of the cache entry being more than a threshold, or based on another issue or condition. It is noted that the problematic cache entry may also be referred to as a first cache entry or as a given cache entry.

Next, a remove cache entry statement is executed to remove the problematic cache entry from the cache (block 410). Then, one or more new cache entries are inserted into the cache subsequent to the removal of the problematic cache entry (block 415). It is noted that the one or more new cache entries may also be referred to as a second cache entry, a third cache entry, and so on. Next, one or more queries are optimized during execution by the database system by accessing the new cache entries (block 420). After block 420, method 400 may end.

Referring now to FIG. 5, a process is depicted for executing a remove cache entry statement, in accordance with some example embodiments. At the beginning of the process, execution of a remove cache entry statement targeting a first cache entry is initiated (block 505). Next, a first cache type and a first ENTRY_HASH of the first cache entry are obtained (block 510). From the first cache type, a cache instance is derived by a cache manager (block 515). Then, the first ENTRY_HASH is matched to all related cache entries of the first cache type (block 520). The matching cache entries are then removed from the cache (block 525). After block 525, method 500 may end.

Turning now to FIG. 6, a process is depicted for responding to a source table modification, in accordance with some example embodiments. A database management system detects a modification of one or more source tables (block 605). Next, in response to detecting the modification of the one or more source tables, the database management system determines which cache entries have become stale as a result of the modification to the one or more source tables (block 610). As used herein, the term "stale" is defined as having old or invalid data that has been updated elsewhere in the overall cache or memory subsystem. In other words, a "stale" cache entry is a cache entry with out-of-date data. In an example, the database management system queries a cache system view (e.g., cache system view 300 of FIG. 3) to determine which entries have become stale based on the modification.

After block 610, the database management system executes one or more cache removal statements to remove individual cache entries that have been identified as stale as a result of the modification to the one or more source tables (block 615). In an example, the database management system executes the newly created SQL statement 'ALTER SYSTEM REMOVE CACHE ( ' ) ENTRY ( ' ', ' ' . . . )' to remove the individual cache entries. Next, the database management system inserts one or more new cache entries into the one or more caches subsequent to removing the individual cache entries that have been identified as stale (block 620). Then, the database management system optimizes the execution of one or more subsequent queries by accessing the one or more new cache entries (block 625). After block 625, method 625 ends.

Referring now to FIG. 7, a process is depicted for generating a view of a database cache, in accordance with some example embodiments. A database management system (e.g., database management system 117 of FIG. 1) generates a cache entry system view (e.g., cache entry system view 300 of FIG. 3) of a database cache (e.g., cache 230A of FIG. 2) (block 705). Also, the database management system generates a new column for the cache entry system view, where the new column is an ENTRY_HASH column which uniquely identifies each entry of the database cache (block 710). Next, the database management system detects a request to remove a given entry of the database cache, where the request includes a given ENTRY_HASH value to locate the given entry of the database cache (block 715). Responsive to receiving the request, the database management system identifies the given entry of the database cache using the given ENTRY_HASH value (block 720). Then, the database management system removes the given entry of the database cache (block 725). Next, the database management system notifies a cache manager (e.g., cache manager 225A of FIG. 2) that the given entry has been removed (block 730). After block 730, method 700 may end. It is noted that while the database management system is described as performing the steps of method 700, it should be understood that any component or sub-component (e.g., execution engine, processor) of the database management system may perform these steps. Additionally, different components or sub-components may perform different steps of method 700. In other words, a first sub-component may perform a first step, a second sub-component may perform a second step, and so on.

Turning now to FIG. 8, a process is depicted for inserting a new entry into a database cache, in accordance with some example embodiments. A cache manager (e.g., cache manager 225A of FIG. 2) inserts a new entry into a database cache (e.g., cache 230A) (block 805). Next, the cache manager notifies a database management system (e.g., database management system 117 of FIG. 1) of the insertion of the new entry into the database cache (block 810). In response to the notification, the database management system inserts a new row, corresponding to the new entry, into a cache entry system view (block 815). Also in response to the notification, the database management system generates a new ENTRY_HASH value for the new entry of the database cache (block 820). Next, the database management system inserts the new ENTRY_HASH value into a corresponding column of the new row in the cache entry system view (block 825). After block 825, method 800 may end.

Figure 9A:
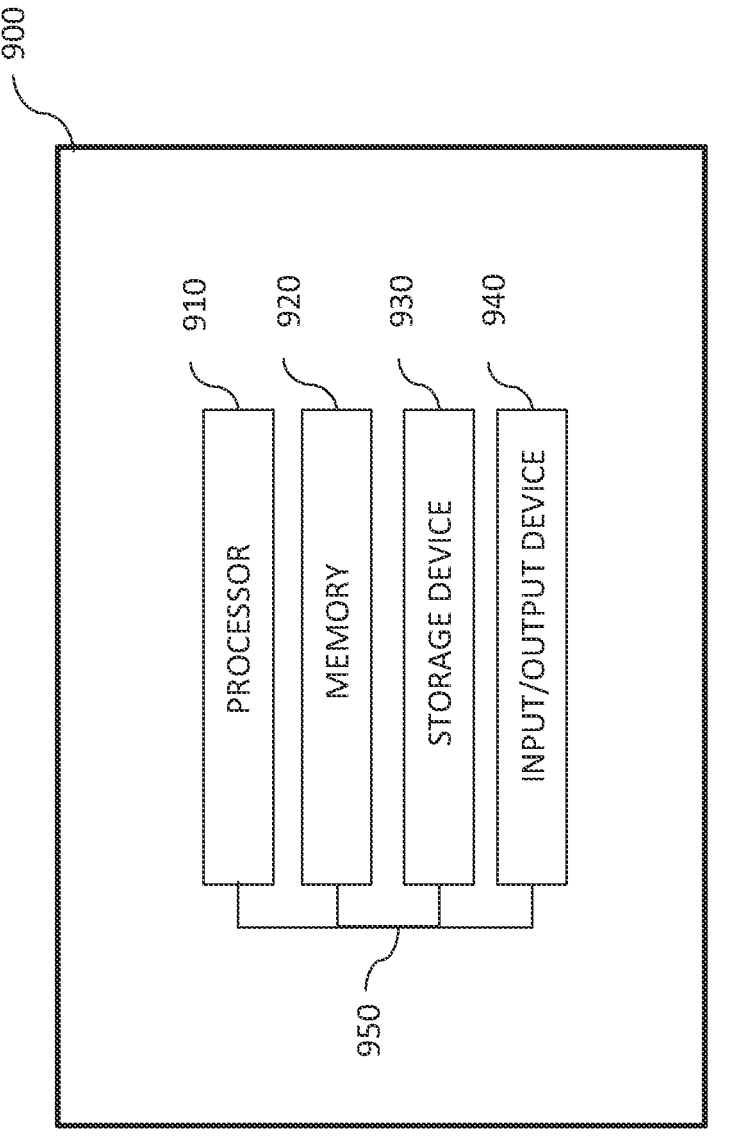
FIG. 9A depicts an example of a system, in accordance with some example implementations of the current subject matter.

In some implementations, the current subject matter may be configured to be implemented in a system 900, as shown in FIG. 9A. The system 900 may include a processor 910, a memory 920, a storage device 930, and an input/output device 940. Each of the components 910, 920, 930 and 940 may be interconnected using a system bus 950. The processor 910 may be configured to process instructions for execution within the system 900. In some implementations, the processor 910 may be a single-threaded processor. In alternate implementations, the processor 910 may be a multi-threaded processor. The processor 910 may be further configured to process instructions stored in the memory 920 or on the storage device 930, including receiving or sending information through the input/output device 940. The memory 920 may store information within the system 900. In some implementations, the memory 920 may be a computer-readable medium. In alternate implementations, the memory 920 may be a volatile memory unit. In yet some implementations, the memory 920 may be a non-volatile memory unit. The storage device 930 may be capable of providing mass storage for the system 900. In some implementations, the storage device 930 may be a computer-readable medium. In alternate implementations, the storage device 930 may be a floppy disk device, a hard disk device, an optical disk device, a tape device, non-volatile solid state memory, or any other type of storage device. The input/output device 940 may be configured to provide input/output operations for the system 900. In some implementations, the input/output device 940 may include a keyboard and/or pointing device. In alternate implementations, the input/output device 940 may include a display unit for displaying graphical user interfaces.

Figure 9B:
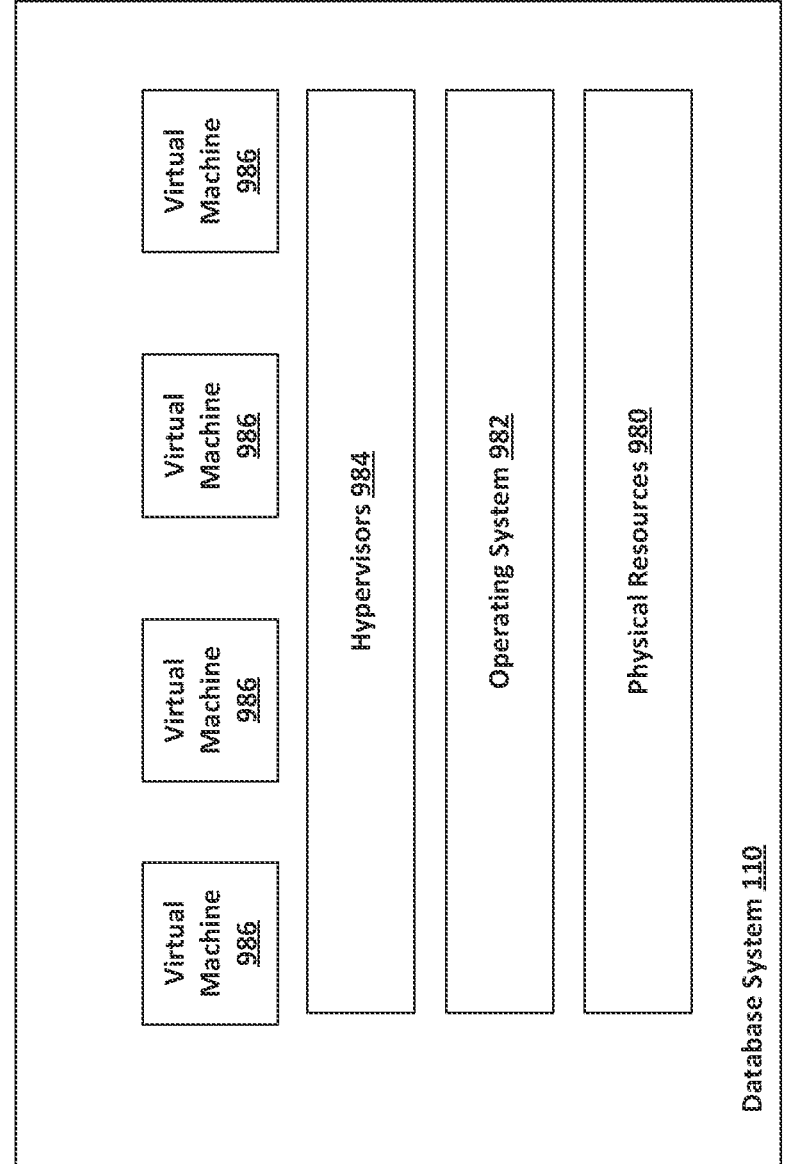
FIG. 9B depicts another example of a system, in accordance with some example implementations of the current subject matter.

FIG. 9B depicts an example implementation of the database system 110 (of FIG. 1). The database system 110 may be implemented using various physical resources 980, such as at least one or more hardware servers, at least one storage, at least one memory, at least one network interface, and the like. The database system 110 may also be implemented using infrastructure, as noted above, which may include at least one operating system 982 for the physical resources 980 and at least one hypervisor 984 (which may create and run at least one virtual machine 986). For example, each multitenant application may be run on a corresponding virtual machine 986.

Figure 10:
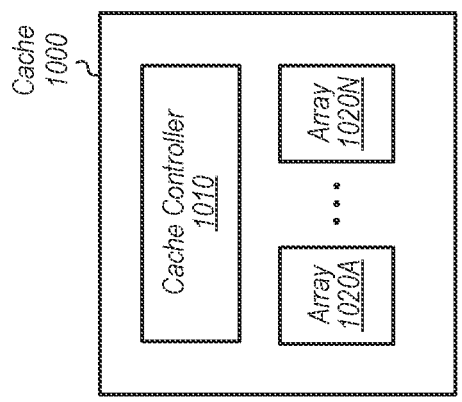
FIG. 10 illustrates a block diagram of a cache, in accordance with some example implementations of the current subject matter.

Referring now to FIG. 10, an example of a cache 1000 is depicted in accordance with various embodiments of the current subject matter. In an example, cache 1000 includes cache controller 1010 and arrays 1020A-N, which are representative of any number and type (e.g., data array, tag array) of arrays. Depending on the embodiment, cache 1000 may include any suitable type and/or combination of direct-mapped and/or associative memory. In an example, caches 230A-230N (of FIG. 2) may be implemented in accordance with the structure of cache 1000. Alternatively, one or more of caches 230A-230N may have other types of suitable structures and/or organizations which may vary from implementation to implementation. Cache controller 1010 may be configured to perform read and write operations to arrays 1020A-N. Cache controller 1010 may also be configured to utilize any of various types of eviction policies (e.g., least recently used (LRU) policy) to evict cache lines from arrays 1020A-N when a new cache line is to be stored in arrays 1020A-N.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising: generating a cache entry system view of a database cache; generating a new column for the cache entry system view, wherein the new column is an entry_hash column to identify each entry of the database cache; detecting a request to remove a given entry of the cache, wherein the request includes a given entry_hash value to locate the given entry of the database cache; responsive to receiving the request, identifying the given entry of the database cache based on the given entry_hash value; removing the given entry of the database cache; and notifying a cache manager that the given entry has been removed.

Example 2: The computer-implemented method of Example 1, further comprising executing a cache removal statement to remove the given entry of the database cache.

Example 3: The computer-implemented method of any of Examples 1-2, wherein the cache removal statement includes the given entry_hash value.

Example 4: The computer-implemented method of any of Examples 1-3, further comprising: detecting a modification of one or more source tables; determining if any database cache entries have become stale as a result of the modification of the one or more source tables; and generating the request to remove the given entry of the database cache responsive to determining that the given entry has become stale as a result of the modification of the one or more source tables.

Example 5: The computer-implemented method of any of Examples 1-4, further comprising inserting, into the database cache, a new entry subsequent to removing the given entry.

Example 6: The computer-implemented method of any of Examples 1-5, further comprising optimizing execution of a query by accessing the new entry of the database cache.

Example 7: The computer-implemented method of any of Examples 1-6, further comprising generating a new entry_ hash value for the new entry of the database cache.

Example 8: The computer-implemented method of any of Examples 1-7, further comprising inserting the new entry_ hash value into the new column of a corresponding row of the cache entry system view of the database cache.

Example 9: A system comprising: at least one processor; and at least one memory including program instructions which when executed by the at least one processor causes operations comprising: generating a cache entry system view of a database cache; generating a new column for the cache entry system view, wherein the new column is an entry_hash column to identify each entry of the database cache; detecting a request to remove a given entry of the cache, wherein the request includes a given entry_hash value to locate the given entry of the database cache; responsive to receiving the request, identifying the given entry of the database cache based on the given entry_hash value; removing the given entry of the database cache; and notifying a cache manager that the given entry has been removed.

Example 10: The system of Example 9, wherein the program instructions are further executable by the at least one processor to cause operations comprising executing a cache removal statement to remove the given entry of the database cache.

Example 11: The system of any of Examples 9-10, wherein the cache removal statement includes the given entry_hash value.

Example 12: The system of any of Examples 9-11, wherein the program instructions are further executable by the at least one processor to cause operations comprising: detecting a modification of one or more source tables; determining if any database cache entries have become stale as a result of the modification of the one or more source tables; and generating the request to remove the given entry of the database cache responsive to determining that the given entry has become stale as a result of the modification of the one or more source tables.

Example 13: The system of any of Examples 9-12, wherein the program instructions are further executable by the at least one processor to cause operations comprising inserting, into the database cache, a new entry subsequent to removing the given entry.

Example 14: The system of any of Examples 9-13, wherein the program instructions are further executable by the at least one processor to cause operations comprising optimizing execution of a query by accessing the new entry of the database cache.

Example 15: The system of any of Examples 9-14, wherein the program instructions are further executable by the at least one processor to cause operations comprising generating a new entry_hash value for the new entry of the database cache.

Example 16: The system of any of Examples 9-15, wherein the program instructions are further executable by the at least one processor to cause operations comprising inserting the new entry_hash value into the new column of a corresponding row of the cache entry system view of the database cache.

Example 17: The system of any of Examples 9-16, wherein the program instructions are further executable by the at least one processor to cause operations comprising generating the query execution plan based on the previously generated query compile tree for the received input query responsive to determining that the second search of the second cache for the first parameterized SQL view results in a hit.

Example 18: A non-transitory computer readable medium storing instructions, which when executed by at least one data processor, cause operations comprising: generating a cache entry system view of a database cache; generating a new column for the cache entry system view, wherein the new column is an entry_hash column to identify each entry of the database cache; detecting a request to remove a given entry of the cache, wherein the request includes a given entry_hash value to locate the given entry of the database cache; responsive to receiving the request, identifying the given entry of the database cache based on the given entry_hash value; removing the given entry of the database cache; and notifying a cache manager that the given entry has been removed.

Example 19: The non-transitory computer readable medium of Example 18, wherein the operations further comprise executing a cache removal statement to remove the given entry of the database cache.

Example 20: The non-transitory computer readable medium of any of Examples 18-19, wherein the cache removal statement includes the given entry_hash value.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:
1. A computer-implemented method comprising:
generating a cache entry system view of a database cache;
generating a new column for the cache entry system view,
    wherein the new column is an entry_hash column to
    identify each entry of the database cache, the entry_
    hash column being configured as a filter to remove one
    or more specified entries from the database cache;
detecting a request to remove a given entry of the cache,
    wherein the request includes a given entry_hash value
    to locate the given entry of the database cache;
responsive to receiving the request, identifying the given
    entry of the database cache based on the given entry_
    hash value;
removing the given entry of the database cache;
notifying a cache manager that the given entry has been
    removed;

inserting, into the database cache, a new entry subsequent to the removing of the given entry;

optimizing execution of a query by accessing the new entry of the database cache;

generating a new entry_hash value for the new entry of the database cache;

inserting the new entry_hash value into the new column of a corresponding row of the cache entry system view of the database cache; and generating a query execution plan based on a query compile tree for the query responsive to inserting the new entry_hash value into the new column of the corresponding row of the cache entry system view of the database cache.

2. The computer-implemented method of claim 1, further comprising executing a cache removal statement to remove the given entry of the database cache.

3. The computer-implemented method of claim 2, wherein the cache removal statement includes the given entry_hash value and a type of the database cache.

4. The computer-implemented method of claim 1, further comprising:

detecting a modification of one or more source tables;

determining if any database cache entries have become stale as a result of the modification of the one or more source tables; and generating the request to remove the given entry of the database cache responsive to determining that the given entry has become stale as a result of the modification of the one or more source tables.

5. A system comprising:

at least one processor; and at least one memory including program instructions which when executed by the at least one processor cause operations comprising:

generating a cache entry system view of a database cache;

generating a new column for the cache entry system view, wherein the new column is an entry_hash column to identify each entry of the database cache, the entry_hash column being configured as a filter to remove one or more specified entries from the database cache;

detecting a request to remove a given entry of the cache, wherein the request includes a given entry_hash value to locate the given entry of the database cache;

responsive to receiving the request, identifying the given entry of the database cache based on the given entry_hash value;

removing the given entry of the database cache;

notifying a cache manager that the given entry has been removed;

inserting, into the database cache, a new entry subsequent to the removing of the given entry;

optimizing execution of a query by accessing the new entry of the database cache;

generating a new entry_hash value for the new entry of the database cache;

inserting the new entry_hash value into the new column of a corresponding row of the cache entry system view of the database cache; and generating a query execution plan based on a query compile tree for the query responsive to inserting the new entry_hash value into the new column of the corresponding row of the cache entry system view of the database cache.

6. The system of claim 5, wherein the program instructions are further executable by the at least one processor to cause operations comprising executing a cache removal statement to remove the given entry of the database cache.

7. The system of claim 6, wherein the cache removal statement includes the given entry_hash value and a type of the database cache.

8. The system of claim 5, wherein the program instructions are further executable by the at least one processor to cause operations comprising:

detecting a modification of one or more source tables;

determining if any database cache entries have become stale as a result of the modification of the one or more source tables; and generating the request to remove the given entry of the database cache responsive to determining that the given entry has become stale as a result of the modification of the one or more source tables.

9. A non-transitory computer readable medium storing instructions, which when executed by at least one data processor, cause operations comprising:

generating a cache entry system view of a database cache;

generating a new column for the cache entry system view, wherein the new column is an entry_hash column to identify each entry of the database cache, the entry_hash column being configured as a filter to remove one or more specified entries from the database cache;

detecting a request to remove a given entry of the cache, wherein the request includes a given entry_hash value to locate the given entry of the database cache;

responsive to receiving the request, identifying the given entry of the database cache based on the given entry_hash value;

removing the given entry of the database cache;

notifying a cache manager that the given entry has been removed;

inserting, into the database cache, a new entry subsequent to the removing of the given entry;

optimizing execution of a query by accessing the new entry of the database cache;

generating a new entry_hash value for the new entry of the database cache;

inserting the new entry_hash value into the new column of a corresponding row of the cache entry system view of the database cache; and generating a query execution plan based on a query compile tree for the query responsive to inserting the new entry_hash value into the new column of the corresponding row of the cache entry system view of the database cache.

10. The non-transitory computer readable medium of claim 9, wherein the operations further comprise executing a cache removal statement to remove the given entry of the database cache.

11. The non-transitory computer readable medium of claim 10, wherein the cache removal statement includes the given entry_hash value and a type of the database cache.

* * * * *